US012249282B2

(12) United States Patent
Yu et al.

(10) Patent No.: US 12,249,282 B2
(45) Date of Patent: Mar. 11, 2025

(54) DISPLAY DEVICE AND METHOD OF DRIVING THE SAME

(71) Applicant: Samsung Display Co., Ltd., Yongin-Si (KR)

(72) Inventors: Byungchang Yu, Yongin-si (KR); Jangmi Kang, Yongin-si (KR); Myunghoon Park, Yongin-si (KR); Dong-Hoon Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/207,682

(22) Filed: Jun. 9, 2023

(65) Prior Publication Data

US 2023/0402008 A1 Dec. 14, 2023

(30) Foreign Application Priority Data

Jun. 14, 2022 (KR) ........................ 10-2022-0072318

(51) Int. Cl.
*G09G 3/3233* (2016.01)

(52) U.S. Cl.
CPC ... *G09G 3/3233* (2013.01); *G09G 2300/0417* (2013.01); *G09G 2300/0819* (2013.01); *G09G 2300/0842* (2013.01); *G09G 2300/0852* (2013.01); *G09G 2300/0861* (2013.01); *G09G 2310/08* (2013.01); *G09G 2320/0233* (2013.01); *G09G 2320/0257* (2013.01); *G09G 2320/043* (2013.01); *G09G 2320/045* (2013.01)

(58) Field of Classification Search
CPC ......... G09G 3/3233; G09G 2300/0426; G09G 2300/043; G09G 2300/0819; G09G 2300/0842; G09G 2300/0852; G09G 2300/0861; G09G 2310/0286; G09G 2310/08; G09G 2320/0233; G09G 2320/0257; G09G 2320/043; G09G 2320/045; G09G 2300/0417
See application file for complete search history.

(56) References Cited

U.S. PATENT DOCUMENTS

| | | | | |
|---|---|---|---|---|
| 8,525,759 B2 | 9/2013 | Long et al. | | |
| 9,917,272 B2 | 3/2018 | Voges et al. | | |
| 2023/0402007 A1* | 12/2023 | Chae | .................... | G09G 3/3233 |
| 2024/0169915 A1* | 5/2024 | Cao | ...................... | G09G 3/3258 |

FOREIGN PATENT DOCUMENTS

| | | |
|---|---|---|
| CN | 111402789 B | 3/2021 |
| KR | 10-1226648 B1 | 1/2013 |
| KR | 10-1666586 B1 | 10/2016 |
| KR | 10-2023232 B1 | 9/2019 |

* cited by examiner

*Primary Examiner* — Julie Anne Watko
(74) *Attorney, Agent, or Firm* — KILE PARK REED & HOUTTEMAN PLLC

(57) ABSTRACT

A display device is disclosed that includes a first circuit including a driving transistor including a first electrode, a second electrode, a gate electrode, and a back gate electrode, a light emitting element including an anode and a cathode connected to the first circuit, and a second circuit including a first transistor connected between the back gate electrode of the driving transistor and a compensation voltage line, and a second transistor connected between the back gate electrode of the driving transistor and a first voltage line.

21 Claims, 14 Drawing Sheets

DISPLAY DEVICE AND METHOD OF DRIVING THE SAME

CROSS-REFERENCE TO RELATED APPLICATION

This U.S. non-provisional patent application claims priority under 35 U.S.C. § 119 of Korean Patent Application No. 10-2022-0072318, filed on Jun. 14, 2022, the entire contents of which are hereby incorporated by reference.

BACKGROUND

The present disclosure relates to a display device having improved display quality and a method of driving the same.

A light emitting display device displays an image using a light emitting diode that generates light by recombining electrons and holes. Such light emitting display devices have the advantage of a high response speed and a low power consumption. A light emitting display device includes pixels connected to data lines and scan lines. Each of the pixels includes a light emitting diode and a circuit for controlling an amount of a current flowing through the light emitting diode in response to a data signal. In this case, light having a predetermined luminance corresponding to the amount of the current flowing through the light emitting diode is generated.

SUMMARY

The present disclosure provides a display device having improved display quality by compensating for a threshold voltage of a driving transistor, and a method of driving the display device.

An embodiment of the inventive concept provides a display device including: a first circuit which is electrically connected to a data line, a plurality of scan lines, and a plurality of voltage lines, and includes a driving transistor including a first electrode, a second electrode, a gate electrode, and a back gate electrode; a light emitting element including an anode, and a cathode connected to the first circuit; and a second circuit including a first transistor connected between the back gate electrode of the driving transistor and a compensation voltage line, and a second transistor connected between the back gate electrode of the driving transistor and a first voltage line among the plurality of voltage lines.

In an embodiment, the first circuit may be provided in plurality, the light emitting element may be provided in plurality, the plurality of first circuits may be electrically connected, in one-to-one correspondence, to the plurality of light emitting elements, respectively, and the second circuit may be electrically connected to first circuits arranged in one row among the plurality of first circuits.

In an embodiment, the first circuit may be provided in plurality, the light emitting element may be provided in plurality, the second circuit may be provided in plurality, the plurality of first circuits may be electrically connected, in one-to-one correspondence, to the plurality of light emitting elements, respectively, and the plurality of second circuits may be electrically connected, in one-to-one correspondence, to the plurality of first circuits, respectively.

In an embodiment, the first circuit may include: a first pixel transistor connected between the first electrode of the driving transistor and the first voltage line; a second pixel transistor connected between the second electrode of the driving transistor and the cathode of the light emitting element; a third pixel transistor connected between the cathode of the light emitting element and a second voltage line among the plurality of voltage lines; a fourth pixel transistor connected between the gate electrode of the driving transistor and a third voltage line among the plurality of voltage lines; a first capacitor connected between the gate electrode of the driving transistor and the first voltage line; a second capacitor including a first electrode connected to the gate electrode of the driving transistor and a second electrode; a fifth pixel transistor connected between the second electrode of the second capacitor and the data line; and a sixth pixel transistor connected between the second electrode of the second capacitor and a fourth voltage line among the plurality of voltage lines, wherein the anode of the light emitting element is connected to a fifth voltage line among the plurality of voltage lines.

In an embodiment, the first circuit may further include: a seventh pixel transistor connected between the gate electrode of the driving transistor and any one of the first electrode and the second electrode of the driving transistor; and an eighth pixel transistor connected between the other of the first electrode and the second electrode of the driving transistor and a sixth voltage line among the plurality of voltage lines.

In an embodiment, a gate electrode of the eighth pixel transistor and a gate electrode of the first transistor may be connected to the same scan line among the plurality of scan lines, and operations of the eighth pixel transistor and the first transistor may be controlled by the same scan signal.

In an embodiment, operations of the first pixel transistor and the second transistor may be controlled by a same signal.

In an embodiment, in an initialization period in which the third pixel transistor, the fourth pixel transistor, and the sixth pixel transistor are turned on, the first electrode of the second capacitor, the second electrode of the second capacitor, and the cathode of the light emitting element may be initialized.

In an embodiment, in a compensation period in which the first transistor, the seventh pixel transistor, and the eighth pixel transistor are turned on, a voltage obtained by adding a threshold voltage of the driving transistor to a voltage provided through the sixth voltage line may be applied to the gate electrode of the driving transistor.

In an embodiment, in a data write period in which the fifth pixel transistor is turned on, a data voltage provided through the data line may be applied to the second electrode of the second capacitor, and in an emission period in which the first pixel transistor and the second pixel transistor are turned on, a current path may be established between the first voltage line and the light emitting element, and a current, from which an influence of the threshold voltage of the driving transistor is removed, may flow through the current path.

In an embodiment, the third voltage line may be the fourth voltage line.

In an embodiment, the second voltage line may be the fifth voltage line.

In an embodiment, the driving transistor may be an N-type thin film transistor.

In an embodiment of the inventive concept, a display device includes: a first circuit including a driving transistor including a first electrode, a second electrode, a gate electrode, and a back gate electrode; and a light emitting element including an anode, and a cathode connected to the first circuit, wherein the first circuit is configured so that, in a compensation period, a first compensation voltage is applied to the back gate electrode of the driving transistor, a second compensation voltage is applied to the first electrode of the driving transistor, and a voltage obtained by adding a threshold voltage of the driving transistor to the second compensation voltage is applied to the gate electrode of the driving transistor.

In an embodiment, the first circuit may be configured so that a current path is established between a driving voltage line and the light emitting element in an emission period, and a current, from which an influence of the threshold voltage of the driving transistor is removed, may flow through the current path in the emission period.

In an embodiment, the display device may further include: a first transistor connected between the back gate electrode of the driving transistor and a compensation voltage line to which the first compensation voltage is applied; and a second transistor connected between the back gate electrode of the driving transistor and a driving voltage line.

In an embodiment, the first circuit may be provided in plurality, the light emitting element may be provided in plurality, the plurality of first circuits may be electrically connected, in one-to-one correspondence, to the plurality of light emitting elements, respectively, and each of a first transistor and a second transistor may be electrically connected to first circuits arranged in one row among the plurality of first circuits.

In an embodiment, the first circuit may be provided in plurality, the light emitting element may be provided in plurality, the first transistor may be provided in plurality, the second transistor may be provided in plurality, the plurality of first circuits may be electrically connected, in one-to-one correspondence, to the plurality of light emitting elements, respectively, the plurality of first transistors may be electrically connected, in one-to-one correspondence, to the plurality of first circuits, respectively, and the plurality of second transistors may be electrically connected, in one-to-one correspondence, to the plurality of first circuits, respectively.

In an embodiment, the driving transistor may be an N-type thin film transistor.

In an embodiment of the inventive concept, a method of driving a display device, which includes a pixel including a first circuit including a driving transistor including a first electrode, a second electrode, a gate electrode, and a back gate electrode, and a light emitting element including an anode, and a cathode connected to the first circuit, includes: initializing the cathode of the light emitting element; compensating by applying a voltage obtained by adding a threshold voltage of the driving transistor to a second compensation voltage to the gate electrode of the driving transistor by applying a first compensation voltage to the back gate electrode of the driving transistor and applying the second compensation voltage to the first electrode of the driving transistor; and allowing the light emitting element to emit light by allowing a current, from which an influence of the threshold voltage of the driving transistor is removed, to flow from the first electrode of the driving transistor to the second electrode thereof.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to describe principles of the inventive concept. In the drawings.

DETAILED DESCRIPTION

Figure 1:
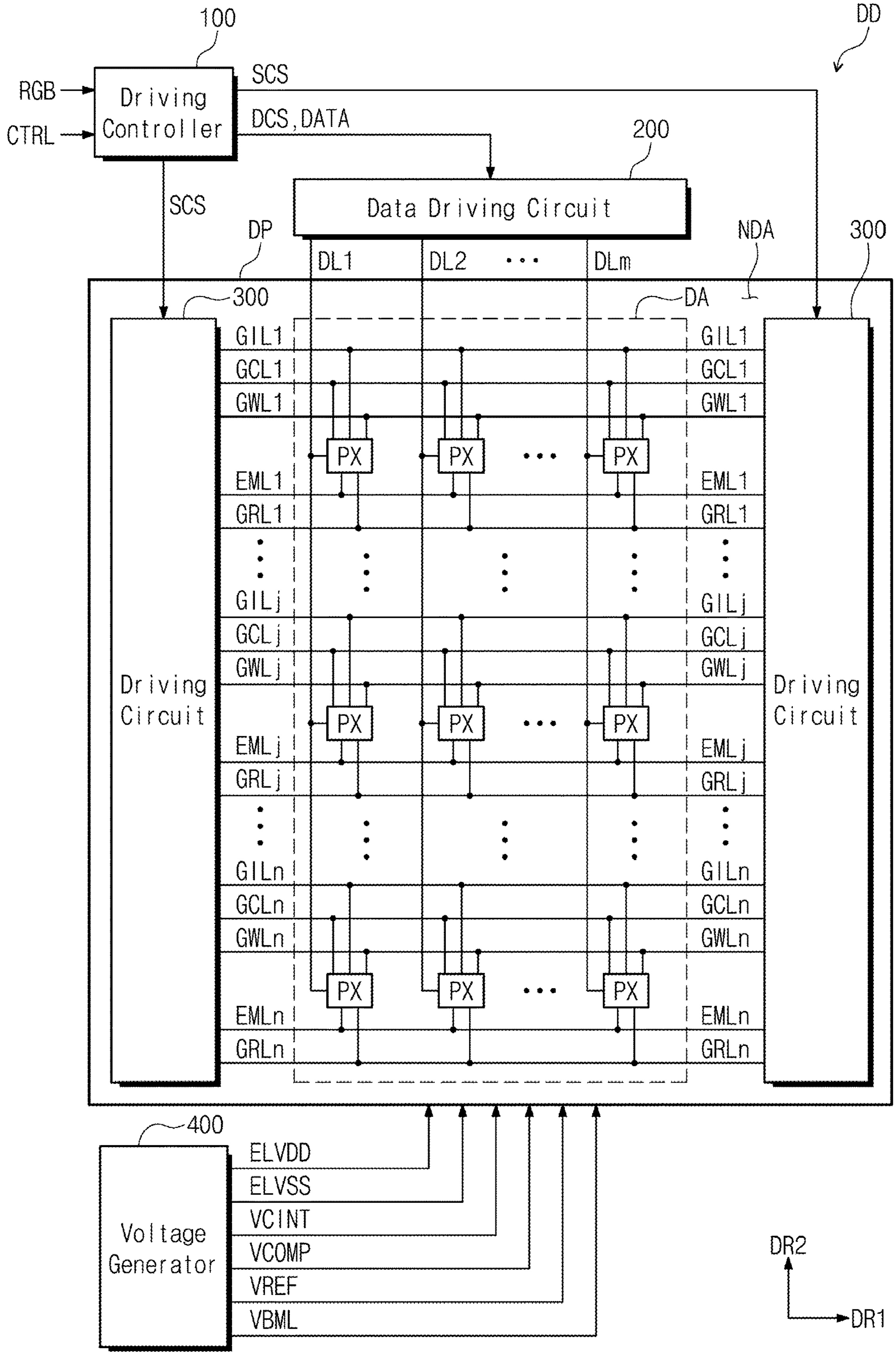
FIG. 1 is a block diagram of a display device according to an embodiment of the inventive concept.

It will be understood that when an element or layer (or region, portion, and the like) is referred to as being "on", "connected to", or "coupled to" another element or layer, it can be directly on, connected to, or coupled to the other element or layer, or intervening elements or layers may be present.

Like reference numerals refer to like elements throughout this specification. In the figures, the ratios and dimensions (e.g., thicknesses) of elements are exaggerated for effective description of the technical contents.

As used herein, the word "or" means logical "or" so that, unless the context indicates otherwise, the expression "A, B, or C" means "A and B and C", "A and B but not C", "A and C but not B", "B and C but not A", "A but not B and not C", "B but not A and not C", and "C but not A and not B".

It will be understood that, although the terms first, second, etc. may be used herein to describe various elements, components, regions, layers, or sections, these elements, components, regions, layers, or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention. As used herein, the singular forms, "a", "an", and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be further understood that the terms "include," "comprise," and "have," and their variations such as "including" when used in this specification, specify the presence of stated features, integers, steps, operations, elements, components, or groups thereof, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having meaning that is consistent with their meaning in the context of the relevant art and should not be interpreted in an overly idealized or overly formal sense unless expressly so defined herein.

Hereinafter, embodiments of the present inventive concept will be explained in detail with reference to the accompanying drawings.

FIG. 1 is a block diagram of a display device DD according to an embodiment of the inventive concept.

Referring to FIG. 1, the display device DD may include a display panel DP, a driving controller 100, and a panel driver. As an example of an embodiment of the inventive concept, the panel driver may include a data driving circuit 200 (or a data driver 200), a driving circuit 300, and a voltage generator 400.

The display panel DP may include a display area DA and a non-display area NDA. The display panel DP may include a plurality of pixels PX disposed in the display area DA. The display panel DP may further include first initialization scan lines GIL1 to GILn, second initialization scan lines GRL1 to GRLn, compensation scan lines GCL1 to GCLn, write scan lines GWL1 to GWLn, emission control lines EML1 to EMLn, and data lines DL1 to DLm. Here, n and m may be positive integers.

The display panel DP may be driven at a predetermined frequency, for example, about 60 Hz, about 120 Hz, or about 240 Hz. Alternatively, the display panel DP may be configured to operate in a first mode in which the display panel DP is driven at the predetermined frequency, or in a second mode in which the display panel DP is driven at a variable frame frequency. For example, the variable frame frequency may vary variously within a range of about 1 Hz to about 240 Hz, but is not particularly limited thereto.

The driving controller 100 receives an image signal RGB and a control signal CTRL. The driving controller 100 generates an image data signal DATA by converting the data format of the image signal RGB according to an interface specification between the driving controller 100 and the data driving circuit 200. The driving controller 100 outputs a first control signal SCS and a second control signal DCS.

The data driving circuit 200 receives the second control signal DCS and the image data signal DATA from the driving controller 100. The data driving circuit 200 converts the image data signal DATA into data signals and outputs the data signals to the data lines DL1 to DLm. The data signals are analog voltages corresponding to gradation values of the image data signal DATA. The data lines DL1 to DLm may be arranged in a first direction DR1 and may each extend in a second direction DR2 crossing the first direction DR1.

The driving circuit 300 may be disposed in the non-display area NDA of the display panel DP. However, the driving circuit 300 is not particularly limited thereto. For example, at least a portion of the driving circuit 300 may be disposed in the display area DA. The driving circuit 300 may be provided in plurality. For example, the plurality of driving circuits 300 may be spaced apart from each other with the display area DA therebetween. However, this is only an example, and one of the two driving circuits 300 illustrated in FIG. 1 may be omitted.

Each of the plurality of pixels PX according to an embodiment of the inventive concept includes a light emitting element ED (see FIG. 2), a first circuit PXC (see FIG. 2) for controlling light emission of the light emitting element ED, and a second circuit CPC (see FIG. 2) electrically connected to the first circuit PXC. The first circuit PXC and the second circuit CPC may constitute one pixel circuit.

The first circuit PXC may include one or more transistors and one or more capacitors. The driving circuits 300 may include transistors provided through a process the same as that of the first circuit PXC and the second circuit CPC.

Each of the first initialization scan lines GIL1 to GILn, the second initialization scan lines GRL1 to GRLn, the compensation scan lines GCL1 to GCLn, the write scan lines GWL1 to GWLn, and the emission control lines EML1 to EMLn may be electrically connected to the driving circuits 300 to receive a signal from each of the driving circuits 300. For example, each of one first initialization scan line GILL one second initialization scan line GRL1, one compensation scan line GCL1, one write scan line GWL1, and one emission control line EML1 may receive a same signal from the two driving circuits 300.

The first initialization scan lines GIL1 to GILn, the second initialization scan lines GRL1 to GRLn, the compensation scan lines GCL1 to GCLn, the write scan lines GWL1 to GWLn, and the emission control lines EML1 to EMLn may each extend in the first direction DR1 and may be spaced apart from each other in the second direction DR2.

Each of the plurality of pixels PX may be electrically connected to four scan lines, one emission control line, and one data line. For example, as illustrated in FIG. 1, pixels PX in a first row may be connected to the scan lines GILL GCL1, GWL1, and GRL1, and the emission control line EML1. Pixels PX in a first column may be connected to the data line DL1. In addition, pixels PX in a j-th row may be connected to the scan lines GILj, GCLj, GWLj, and GRLj, and the emission control line EMLj. Here, j may be a positive integer less than or equal to n.

The voltage generator 400 generates voltages necessary for the operation of the display panel DP. In this embodiment, the voltage generator 400 may generate a first driving voltage ELVSS, a second driving voltage ELVDD, an initialization voltage VCINT, a second compensation voltage VCOMP, a reference voltage VREF, and a first compensation voltage VBML.

Figure 2:
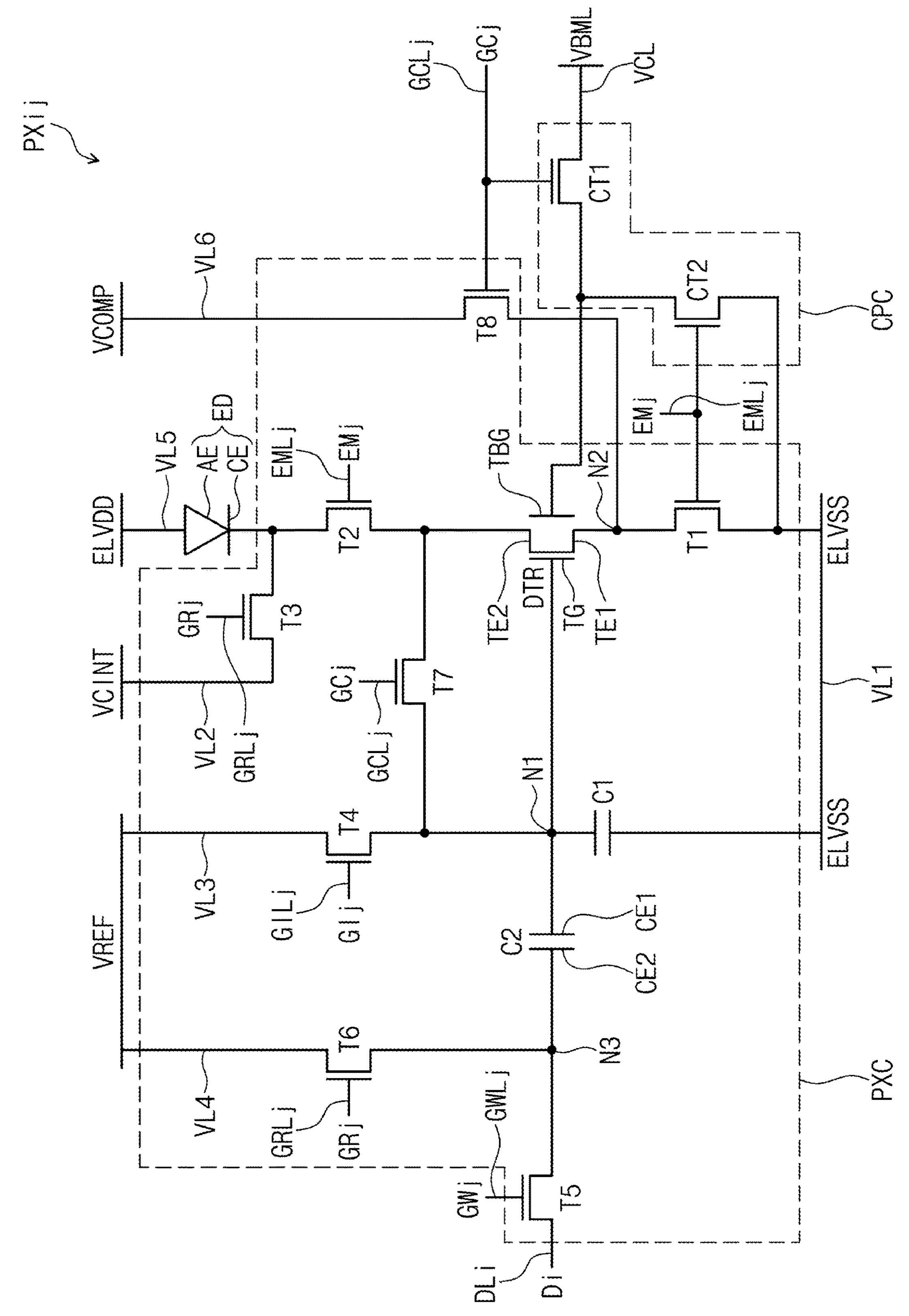
FIG. 2 is an equivalent circuit diagram of a pixel according to an embodiment of the inventive concept.

FIG. 2 is an equivalent circuit diagram of a pixel PXij according to an embodiment of the inventive concept.

Referring to FIGS. 1 and 2, a pixel PXij may include the first circuit PXC, the second circuit CPC, and at least one light emitting element ED. The pixel PXij may be connected to a j-th first initialization scan line GILj, a j-th second initialization scan line GRLj, a j-th compensation scan line GCLj, a j-th write scan line GWLj, a j-th emission control line EMLj, and an i-th data line DLi.

Each of the plurality of pixels PX illustrated in FIG. 1 may have the same circuit configuration as the pixel PXij illustrated in FIG. 2. Accordingly, in the display panel DP, each of the first circuit PXC, the light emitting element ED, and the second circuit CPC may be provided in plurality. The plurality of first circuits PXC may be electrically connected, in one-to-one correspondence, to the plurality of light emitting elements ED, respectively. In addition, the plurality of second circuits CPC may be electrically connected, in one-to-one correspondence, to the plurality of first circuits PXC, respectively. In this case, the number of the first circuits PXC included in the display panel DP may be the same as the number of the second circuits CPC included therein.

Referring to FIG. 2, the first circuit PXC may include a driving transistor DTR, first to eighth pixel transistors T1, T2, T3, T4, T5, T6, T7, and T8, a first capacitor C1, and a second capacitor C2. The second circuit CPC may include a first transistor CT1 and a second transistor CT2.

Each of the driving transistor DTR, the first to eighth pixel transistors T1, T2, T3, T4, T5, T6, T7, and T8, the first transistor CT1, and the second transistor CT2 may be an N-type thin film transistor having an oxide semiconductor as a semiconductor layer. In particular, in the case that the N-type thin film transistor is applied to the driving transistor DTR, the variation of element properties due to previous data may be reduced compared with the case that a P-type thin film transistor is applied. Accordingly, the property of overcoming an instantaneous afterimage may be improved. The N-type thin film transistor may be an N-channel metal-oxide semiconductor thin film transistor including an oxide semiconductor layer. The P-type thin film transistor may be a P-channel metal-oxide semiconductor thin film transistor including a silicon semiconductor layer.

The light emitting element ED may include an anode AE and a cathode CE. In the case that the light emitting element ED is an organic light emitting element, the light emitting element ED may further include an organic layer disposed between the anode AE and the cathode CE. The cathode CE of the light emitting element ED may be connected to the first circuit PXC. That is, the light emitting element ED may be an inverted organic light emitting diode (OLED). The light emitting element ED may emit light corresponding to an amount of a current flowing through the driving transistor DTR of the first circuit PXC.

According to an embodiment of the inventive concept, the driving transistor DTR may be an N-type thin film transistor, and the cathode CE of the light emitting element ED may be connected to a drain (or a second electrode TE2) of the driving transistor DTR. In this case, even when the light emitting element ED deteriorates, the voltage of the terminal of a source (or a first electrode TE1) of the driving transistor DTR may not shift. That is, even when the light emitting element ED deteriorates, a gate-source voltage of the driving transistor DTR may not change. Accordingly, even when the usage time of the display panel DP increases, the variation in the amount of the current flowing through the driving transistor DTR is reduced, so that an afterimage defect (or a long-term afterimage defect) of the display panel DP may be reduced, and the lifespan of the display panel DP may be improved.

The j-th first initialization scan line GILj may transmit a first initialization scan signal GIj, the j-th second initialization scan line GRLj may transmit a second initialization scan signal GRj, the j-th compensation scan line GCLj may transmit a compensation scan signal GCj, the j-th write scan line GWLj may transmit a write scan signal GWj, the j-th emission control line EMLj may transmit an emission control signal EMj, and the i-th data line DLi may transmit a data signal Di. The data signal Di may have a voltage level corresponding to a gradation value of the image data signal DATA outputted from the driving controller 100.

In addition, the pixel PXij may be connected to first to sixth voltage lines VL1, VL2, VL3, VL4, VL5, and VL6, and a compensation voltage line VCL. The first voltage line VL1 may transmit the first driving voltage ELVSS and may be referred to as a driving voltage line. The second voltage line VL2 may transmit the initialization voltage VCINT. The third voltage line VL3 and the fourth voltage line VL4 may transmit the reference voltage VREF. The third voltage line VL3 may be the fourth voltage line VL4. Accordingly, the fourth pixel transistor T4 and the sixth pixel transistor T6 may be connected to the same voltage line (the third voltage line VL3 or the fourth voltage line VL4). The fifth voltage line VL5 may transmit the second driving voltage ELVDD. The sixth voltage line VL6 may transmit the second compensation voltage VCOMP. The compensation voltage line VCL may transmit the first compensation voltage VBML.

The driving transistor DTR may include the first electrode TE1, the second electrode TE2, a gate electrode TG, and a back gate electrode TBG. The gate electrode TG may be connected to a first node N1, and the first electrode TE1 may be connected to a second node N2. The first electrode TE1 may be referred to as the source of the driving transistor DTR, and the second electrode TE2 may be referred to as the drain of the driving transistor DTR.

The first capacitor C1 and the second capacitor C2 may be connected to the first node N1. The first capacitor C1 may be connected between the first node N1 and the first voltage line VL1. The second capacitor C2 may include a first electrode CE1 and a second electrode CE2, the first electrode CE1 may be connected to the first node N1, and the second electrode CE2 may be connected to a third node N3.

The first pixel transistor T1 may be connected between the first electrode TE1 of the driving transistor DTR and the first voltage line VL1. The second pixel transistor T2 may be connected between the second electrode TE2 of the driving transistor DTR and the cathode CE of the light emitting element ED. Operations of the first pixel transistor T1 and the second pixel transistor T2 may be controlled in response to the emission control signal EMj provided through the j-th emission control line EMLj. As the first pixel transistor T1 and the second pixel transistor T2 are turned on, a current path may be established between the first voltage line VL1 and the light emitting element ED through the first pixel transistor T1, the second pixel transistor T2, and the driving transistor DTR.

The third pixel transistor T3 may be connected between the cathode CE of the light emitting element ED and the second voltage line VL2. An operation of the third pixel transistor T3 may be controlled in response to the second initialization scan signal GRj provided through the j-th second initialization scan line GRLj. The third pixel transistor T3 may be turned on according to the second initialization scan signal GRj to electrically connect the cathode CE of the light emitting element ED and the second voltage line VL2.

The fourth pixel transistor T4 may be connected between the gate electrode TG of the driving transistor DTR and the third voltage line VL3. An operation of the fourth pixel transistor T4 may be controlled in response to the first initialization scan signal GIj provided through the j-th first initialization scan line GILj. The fourth pixel transistor T4 may be turned on according to the first initialization scan signal GIj to electrically connect the gate electrode TG of the driving transistor DTR and the third voltage line VL3.

The fifth pixel transistor T5 may be connected between the second electrode CE2 of the second capacitor C2 and the i-th data line DLi. An operation of the fifth pixel transistor T5 may be controlled in response to the write scan signal GWj provided through the j-th write scan line GWLj. The fifth pixel transistor T5 may be turned on according to the write scan signal GWj to transmit, to the third node N3, the data signal Di transmitted from the i-th data line DLi. The fifth pixel transistor T5 may be referred to as a switching thin film transistor.

The sixth pixel transistor T6 may be connected between the second electrode CE2 of the second capacitor C2 and the fourth voltage line VL4. An operation of the sixth pixel transistor T6 may be controlled in response to the second initialization scan signal GRj provided through the j-th second initialization scan line GRLj. The sixth pixel transistor T6 may be turned on according to the second initialization scan signal GRj to electrically connect the third node N3 and the fourth voltage line VL4.

The seventh pixel transistor T7 may be connected between the gate electrode TG of the driving transistor DTR and the second electrode TE2 of the driving transistor DTR. The eighth pixel transistor T8 may be connected between the first electrode TE1 of the driving transistor DTR and the sixth voltage line VL6. Operations of the seventh pixel transistor T7 and the eighth pixel transistor T8 may be controlled in response to the compensation scan signal GCj provided through the j-th compensation scan line GCLj.

The anode AE of the light emitting element ED may be connected to the fifth voltage line VL5. The second driving voltage ELVDD may be provided to the fifth voltage line VL5. The second driving voltage ELVDD may have a voltage level higher than that of the first driving voltage ELVSS.

The second circuit CPC may include the first transistor CT1 and the second transistor CT2.

The first transistor CT1 may be connected between the back gate electrode TBG of the driving transistor DTR and the compensation voltage line VCL. Gate electrodes of the first transistor CT1 and the eighth pixel transistor T8 may be connected to the same scan line, for example, the j-th compensation scan line GCLj. Accordingly, an operation of the first transistor CT1 may be controlled in response to the compensation scan signal GCj provided through the j-th compensation scan line GCLj.

The second transistor CT2 may be connected between the back gate electrode TBG of the driving transistor DTR and the first voltage line VL1. Gate electrodes of the second transistor CT2 and the first pixel transistor T1 may be connected to the same line, for example, the j-th emission control line EMLj. Accordingly, an operation of the second transistor CT2 may be controlled in response to the emission control signal EMj provided through the j-th emission control line EMLj. For example, in a period in which the emission control signal EMj is activated, that is, in a fourth period SC4 (see FIG. 3), the back gate electrode TBG of the driving transistor DTR may be synchronized with the second node N2 by the second transistor CT2.

Figure 3:
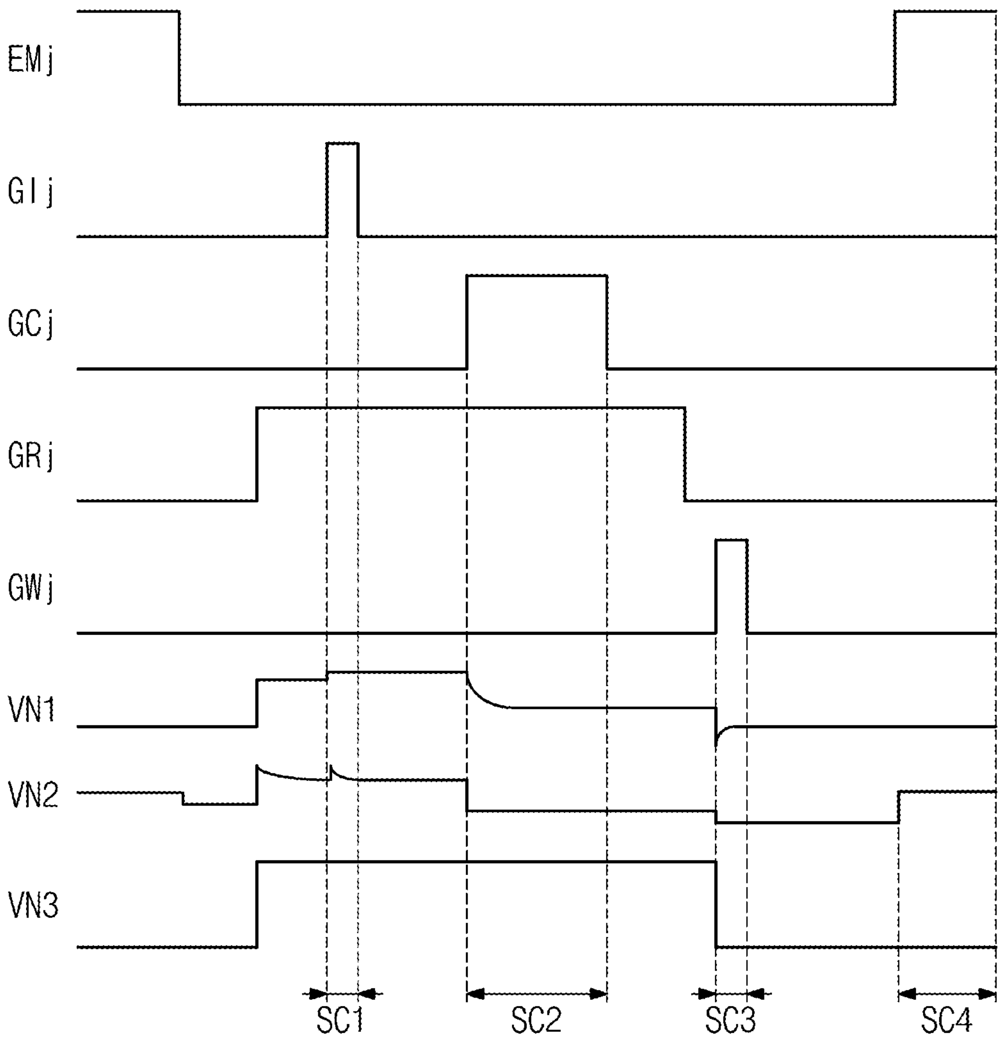
FIG. 3 is a timing diagram for describing an operation of a pixel according to an embodiment of the inventive concept.

FIG. 3 is a timing diagram for describing an operation of a pixel PXij according to an embodiment of the inventive concept.

Referring to FIGS. 2 and 3, waveforms of the emission control signal EMj, the first initialization scan signal GIj, the compensation scan signal GCj, the second initialization scan signal GRj, the write scan signal GWj, and voltages VN1, VN2, and VN3 of the first to third nodes N1, N2, and N3 are illustrated.

The pixel PXij may be driven while passing through a first period SC1, a second period SC2, a third period SC3, and the fourth period SC4. The first period SC1, the second period SC2, the third period SC3, and the fourth period SC4 are periods divided according to the operation of the pixel PXij, and the first period SC1 may be referred to as an initialization period, the second period SC2 may be referred to as a compensation period, the third period SC3 may be referred to as a data write period, and the fourth period SC4 may be referred to as an emission period.

Figure 4A:
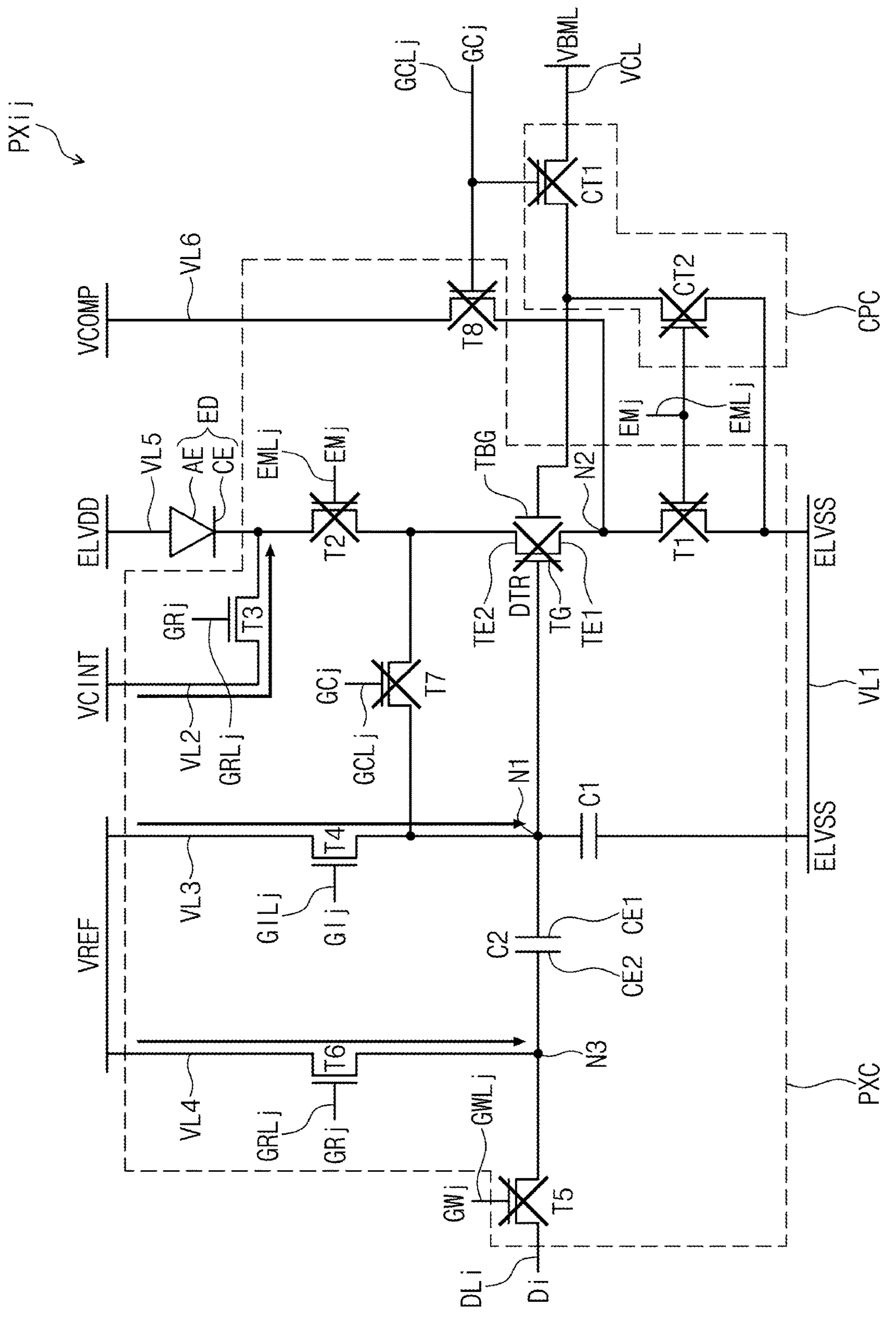
FIG. 4A is a view for describing an operation of a pixel in the first period illustrated in FIG. 3.

FIG. 4A is a view for describing an operation of a pixel PXij in the first period SC1 illustrated in FIG. 3.

Referring to FIGS. 3 and 4A, the first period SC1 is a period in which both ends of the second capacitor C2 and the cathode CE of the light emitting element ED are initialized. In the first period SC1, the first initialization scan signal GIj and the second initialization scan signal GRj may each have an active level (e.g., a high level).

When the third pixel transistor T3 is turned on, the cathode CE of the light emitting element ED may be initialized to the initialization voltage VCINT. The first electrode CE1 of the second capacitor C2 or the first node N1 may be initialized to the reference voltage VREF when the fourth pixel transistor T4 is turned on, and the second electrode CE2 of the second capacitor C2 or the third node N3 may be initialized to the reference voltage VREF when the sixth pixel transistor T6 is turned on.

Figure 4B:
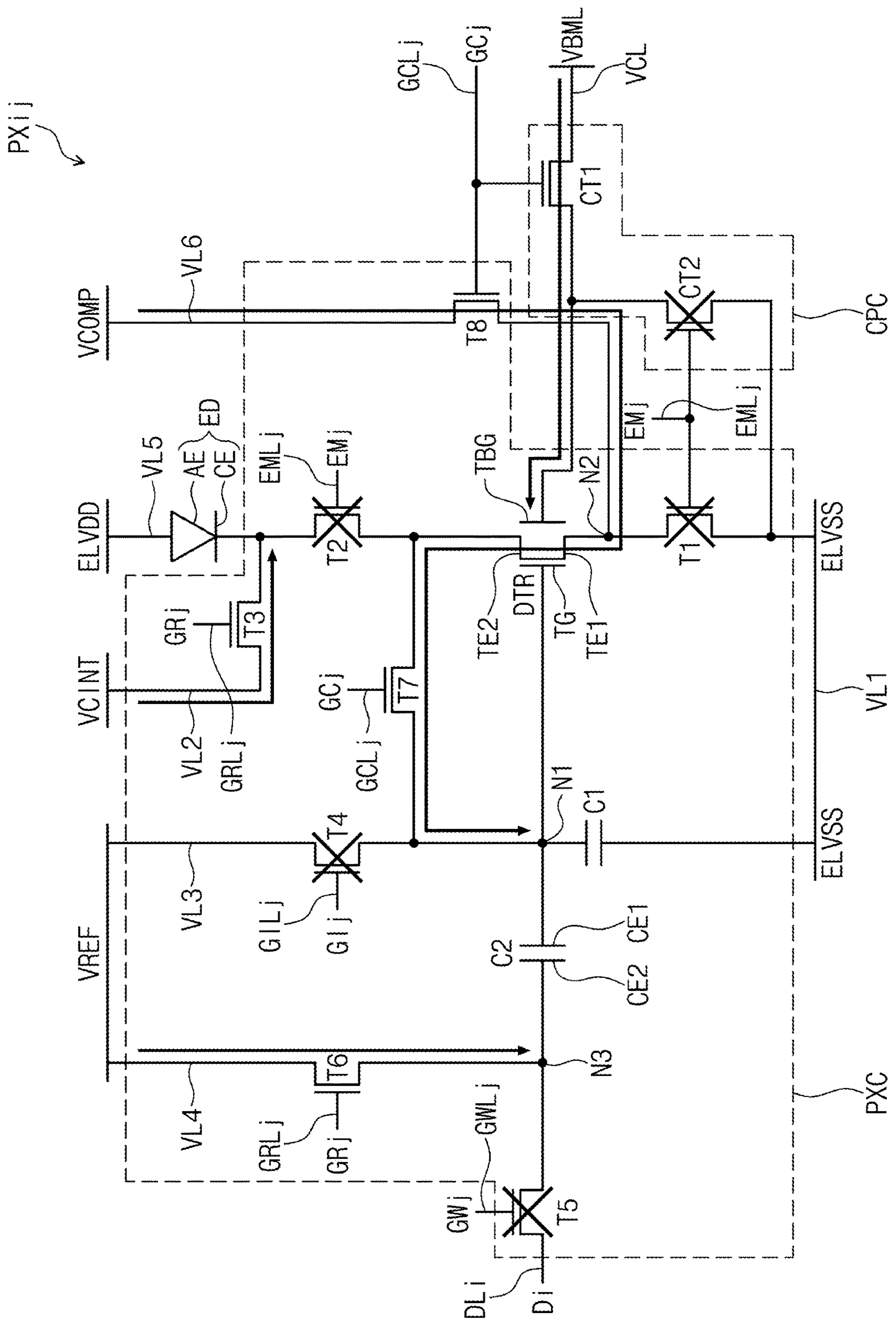
FIG. 4B is a view for describing an operation of a pixel in the second period illustrated in FIG. 3.

FIG. 4B is a view for describing an operation of a pixel PXij in the second period SC2 illustrated in FIG. 3.

Referring to FIGS. 3 and 4B, the second period SC2 is the compensation period in which a threshold voltage of the driving transistor DTR is compensated for. In the second period SC2, the second initialization scan signal GRj and the compensation scan signal GCj may each have the active level (e.g., the high level).

When the first transistor CT1 is turned on, the first compensation voltage VBML may be applied to the back gate electrode TBG of the driving transistor DTR. When the eighth pixel transistor T8 is turned on, the second compensation voltage VCOMP may be applied to the first electrode TE1 (or the source) of the driving transistor DTR, and a voltage VN2 of the second node N2 may be the second compensation voltage VCOMP.

A reverse bias voltage (hereinafter referred to as $V_{BS}$) between the back gate electrode TBG and the terminal of the source of the driving transistor DTR may be kept constant as a difference between the first compensation voltage VBML and the second compensation voltage VCOMP. That is, the constant $V_{BS}$ is applied in the compensation period regardless of a previously written data voltage. Accordingly, the threshold voltage of the driving transistor DTR may shift in a constant way without being affected by the data voltage.

According to an embodiment of the inventive concept, the threshold voltage of the driving transistor DTR may be shifted in a positive direction by adjusting the voltage level of the first compensation voltage VBML. In this case, the threshold voltage of the driving transistor DTR, which is an N-type thin film transistor, may be compensated for in a diode connection method.

When the seventh pixel transistor T7 is turned on, the second electrode TE2 (or the drain) of the driving transistor DTR may be connected to the gate electrode TG of the driving transistor DTR. That is, the driving transistor DTR may be diode-connected. In this case, a voltage VN1 of the first node N1 may be changed to the sum of the second compensation voltage VCOMP and the threshold voltage (hereinafter referred to as $V_{TH}$) of the driving transistor DTR. Compensation stability may be improved because a value reflecting the threshold voltage of the driving transistor DTR is directly applied to the first node N1.

Figure 4C:
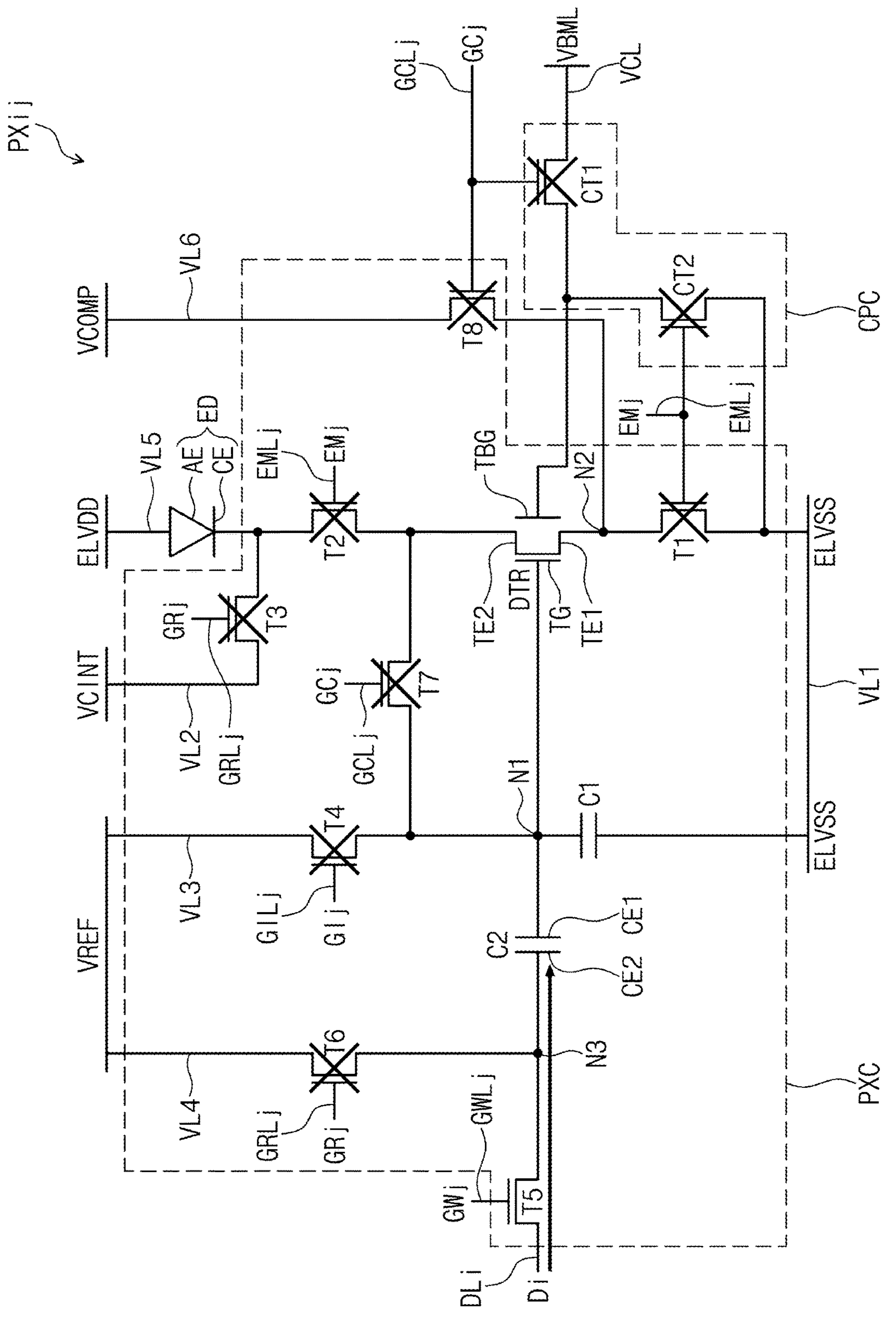
FIG. 4C is a view for describing an operation of a pixel in the third period illustrated in FIG. 3.

FIG. 4C is a view for describing an operation of a pixel PXij in the third period SC3 illustrated in FIG. 3.

Referring to FIGS. 3 and 4C, the third period SC3 is the data write period in which the data signal Di is inputted. In the third period SC3, the write scan signal GWj may have the active level (e.g., the high level). The fifth pixel transistor T5 may be turned on in response to the write scan signal GWj.

When the fifth pixel transistor T5 is turned on, a voltage of the second electrode CE2 of the second capacitor C2, i.e., a voltage VN3 of the third node N3, may be changed from the reference voltage VREF to a data voltage (hereinafter referred to as $V_{DATA}$) corresponding to the data signal Di. Accordingly, a voltage of the first electrode CE1 of the second capacitor C2, i.e., the voltage VN1 of the first node N1, may be changed to a value of the following expression.

$$(V_{DATA} - VREF)\frac{C1_C}{C1_C + C2_C} + (VCOMP + V_{TH})$$

$V_{DATA}$ is the data voltage corresponding to the data signal Di, VREF is the reference voltage VREF, $C1_C$ is capacitance of the first capacitor C1, $C2_C$ is capacitance of the second capacitor C2, VCOMP is the second compensation voltage VCOMP, and $V_{TH}$ is the threshold voltage of the driving transistor DTR.

Figure 4D:
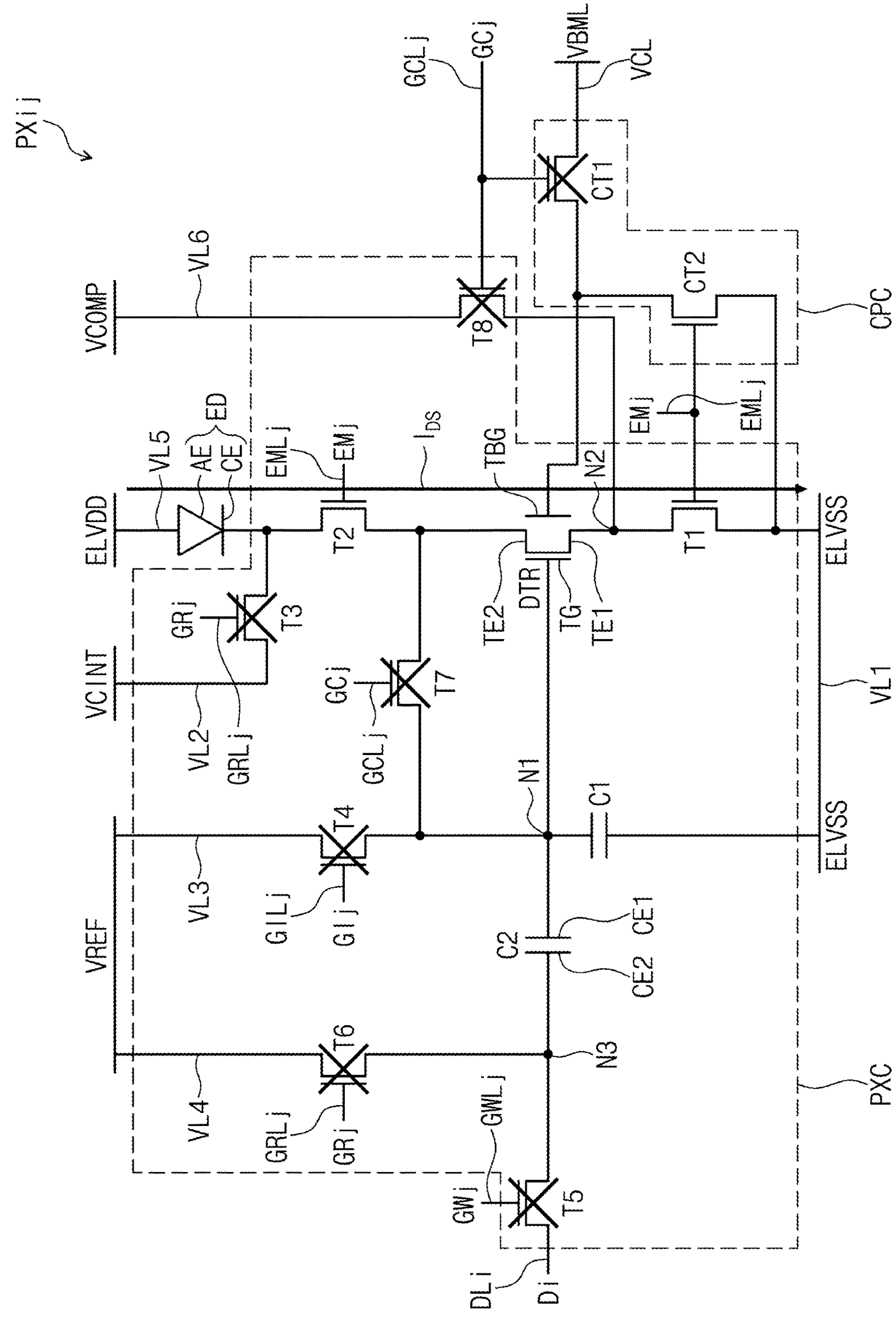
FIG. 4D is a view for describing an operation of a pixel in the fourth period illustrated in FIG. 3.

FIG. 4D is a view for describing an operation of a pixel PXij in the fourth period SC4 illustrated in FIG. 3.

Referring to FIGS. 3 and 4D, the fourth period SC4 is the emission period in which the light emitting element ED emits light. In the fourth period SC4, the emission control signal EMj may have the active level (e.g., the high level). The first and second pixel transistors T1 and T2 may be turned on in response to the emission control signal EMj.

When the first and second pixel transistors T1 and T2 are turned on, a current path is established between the first voltage line VL1 and the light emitting element ED. As indicated in the following equation, a current ($I_{DS}$), from which the influence of the threshold voltage of the driving transistor DTR is removed, may flow through the current path. According to an embodiment of the inventive concept, as the first compensation voltage VBML is applied to the gate electrode TG of the driving transistor DTR, i.e., to the first node N1, compensation stability may be improved.

$$\begin{aligned} I_{DS} &= K \times (VN1 - VN2 - V_{TH})^2 \\ &= K \times \left((V_{DATA} - VREF)\frac{C1_C}{C1_C + C2_C} + (VCOMP + V_{TH}) - VN2 - V_{TH}\right)^2 \\ &= K \times \left((V_{DATA} - VREF)\frac{C1_C}{C1_C + C2_C} + VCOMP + V_{N2}\right)^2 \end{aligned}$$

K is μ·Cox·W/L, wherein μ may be electric field mobility, Cox may be the capacitance of a gate insulating film, and W/L is the ratio of width to length of a channel of the driving transistor DTR.

Figure 5:
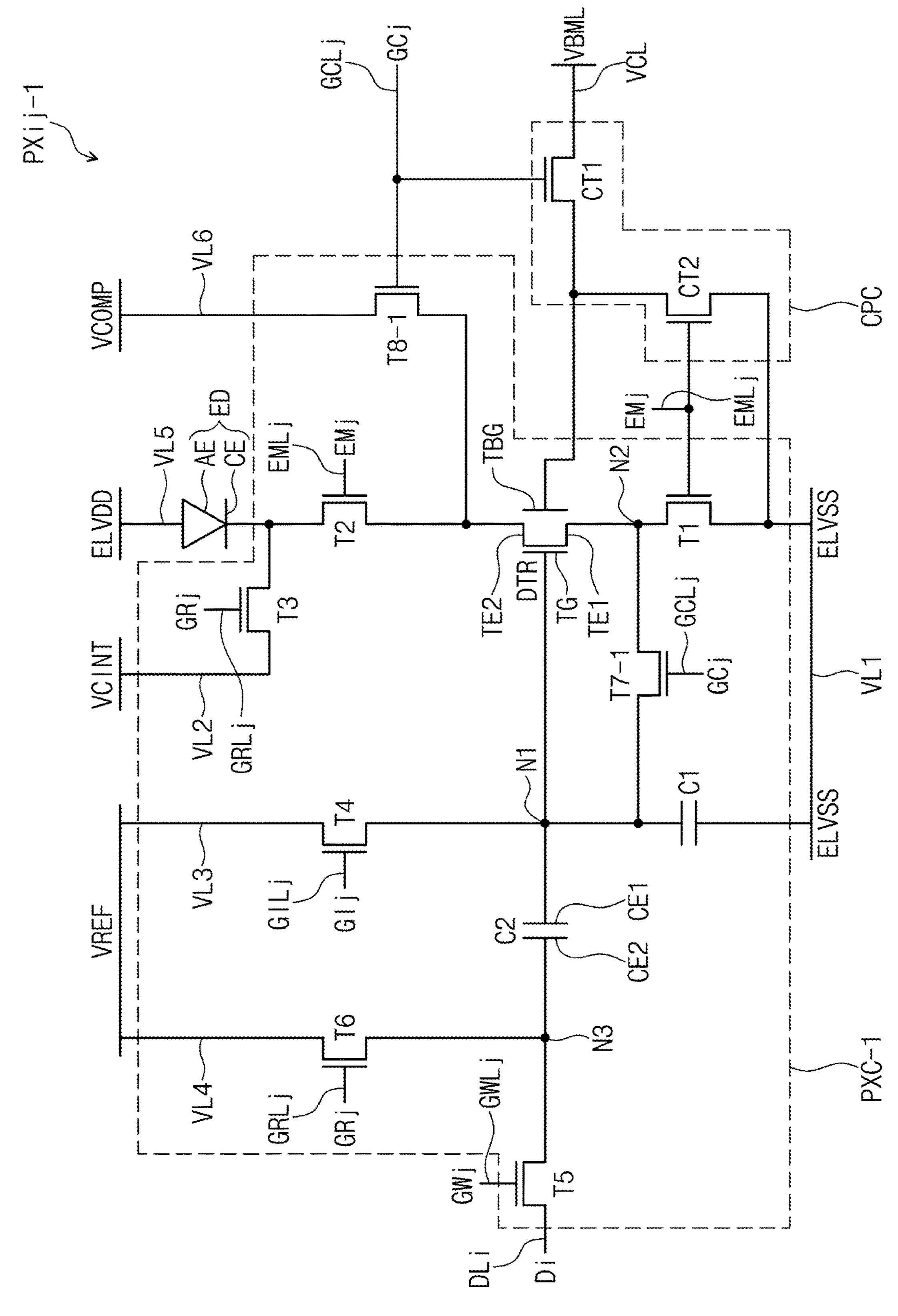
FIG. 5 is an equivalent circuit diagram of a pixel according to an embodiment of the inventive concept.

FIG. 5 is an equivalent circuit diagram of a pixel PXij-1 according to an embodiment of the inventive concept. When a description is given with reference to FIG. 5, portions different from those of FIG. 2 will be described, and the same components are denoted by the same reference numerals, and a description of the same components will not be given.

Referring to FIG. 5, a pixel PXij-1 may include a first circuit PXC-1, a second circuit CPC, and at least one light emitting element ED. The first circuit PXC-1 may include a driving transistor DTR, first to eighth pixel transistors T1, T2, T3, T4, T5, T6, T7-1, and T8-1, a first capacitor C1, and a second capacitor C2. The second circuit CPC may include a first transistor CT1 and a second transistor CT2.

The seventh pixel transistor T7-1 may be connected between a gate electrode TG of the driving transistor DTR and a first electrode TE1 of the driving transistor DTR. The eighth pixel transistor T8-1 may be connected between a second electrode TE2 of the driving transistor DTR and a sixth voltage line VL6. Operations of the seventh pixel transistor T7-1 and the eighth pixel transistor T8-1 may be controlled in response to a compensation scan signal GCj provided through a j-th compensation scan line GCLj.

When the seventh pixel transistor T7-1 is turned on, the first electrode TE1 of the driving transistor DTR may be connected to the gate electrode TG of the driving transistor DTR. When the eighth pixel transistor T8-1 is turned on, a second compensation voltage VCOMP may be applied to the second electrode TE2 of the driving transistor DTR.

Figure 6:
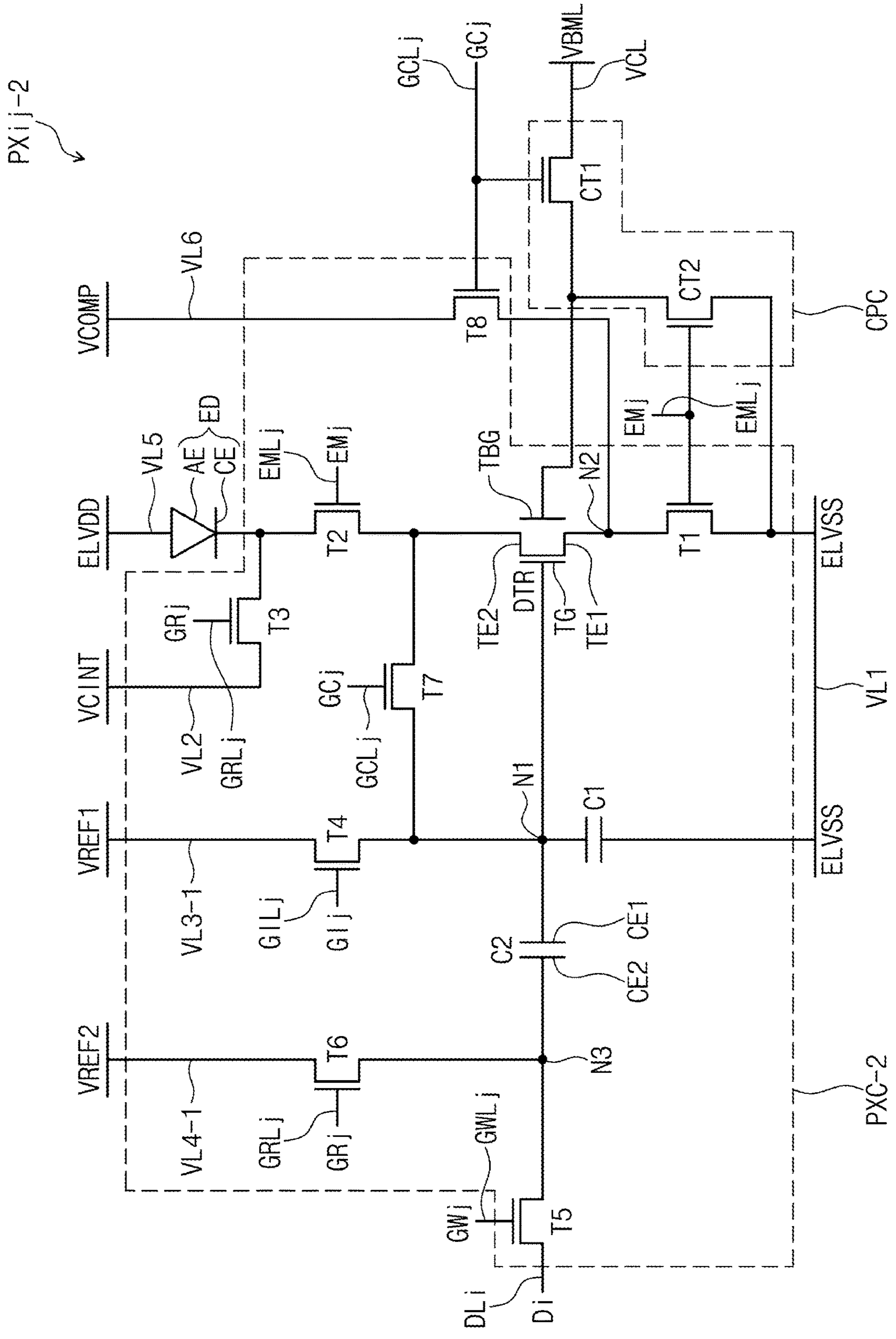
FIG. 6 is an equivalent circuit diagram of a pixel according to an embodiment of the inventive concept.

FIG. 6 is an equivalent circuit diagram of a pixel PXij-2 according to an embodiment of the inventive concept. When a description is given with reference to FIG. 6, portions different from those of FIG. 2 will be described, and the same components are denoted by the same reference numerals, and a description of the same components will not be given.

Referring to FIG. 6, a pixel PXij-2 may include a first circuit PXC-2, a second circuit CPC, and at least one light emitting element ED.

The pixel PXij-2 may be connected to first to sixth voltage lines VL1, VL2, VL3-1, VL4-1, VL5, and VL6, and a compensation voltage line VCL. The third voltage line VL3-1 may transmit a first reference voltage VREF1, and the fourth voltage line VL4-1 may transmit a second reference voltage VREF2. The first reference voltage VREF1 and the second reference voltage VREF2 may have the same voltage levels or different voltage levels.

Figure 7:
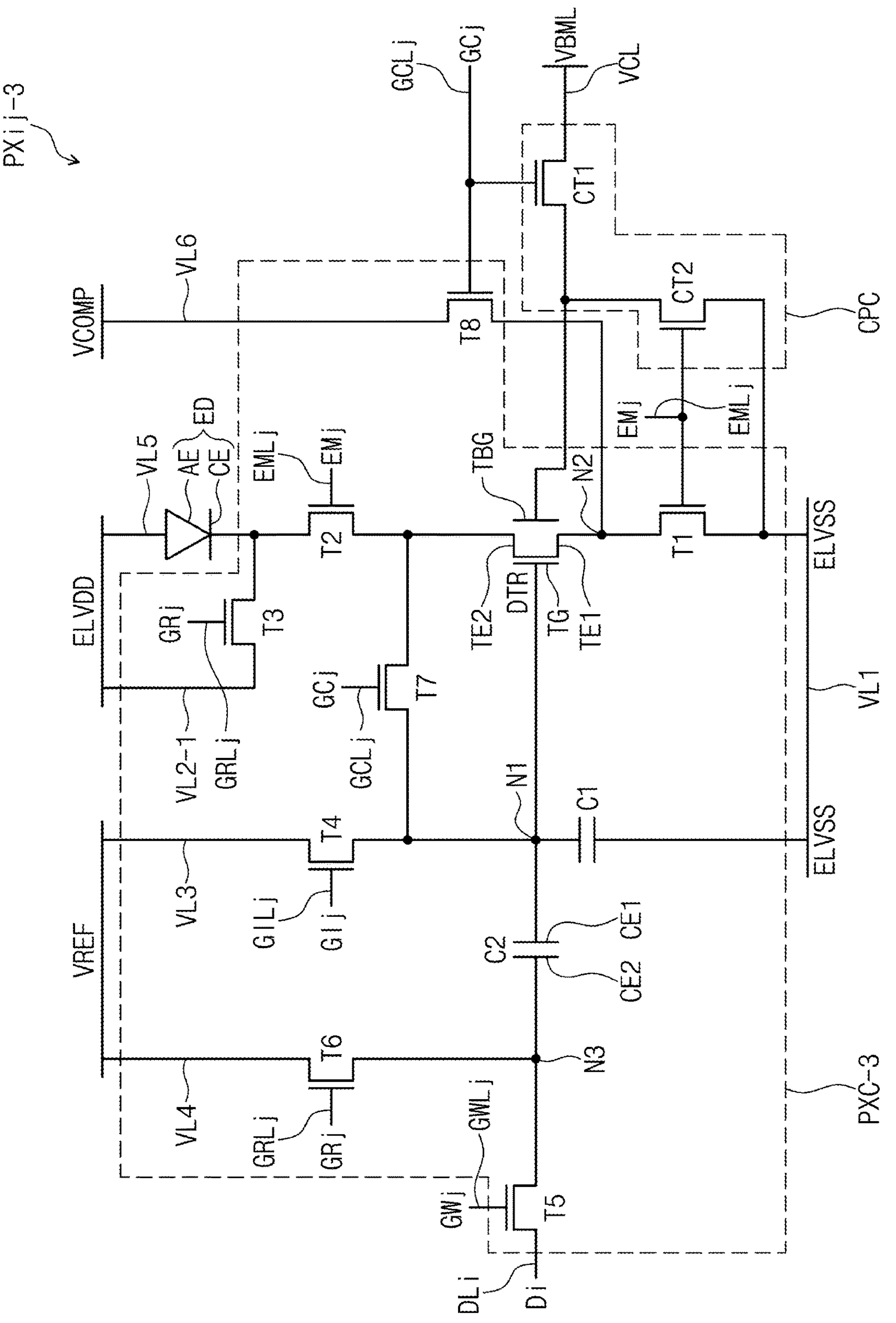
FIG. 7 is an equivalent circuit diagram of a pixel according to an embodiment of the inventive concept.

FIG. 7 is an equivalent circuit diagram of a pixel PXij-3 according to an embodiment of the inventive concept. When a description is given with reference to FIG. 7, portions different from those of FIG. 2 will be described, and the same components are denoted by the same reference numerals, and a description of the same components will not be given.

Referring to FIG. 7, a pixel PXij-3 may include a first circuit PXC-3, a second circuit CPC, and at least one light emitting element ED.

The pixel PXij-3 may be connected to first to sixth voltage lines VL1, VL2-1, VL3, VL4, VL5, and VL6, and a compensation voltage line VCL. The second voltage line VL2-1 may transmit a second driving voltage ELVDD. The fifth voltage line VL5 may transmit the second driving voltage ELVDD. The second voltage line VL2-1 may be the fifth voltage line VL5. That is, a third pixel transistor T3 and an anode AE of the light emitting element ED may be connected to the same voltage line (the second voltage line VL2-1 or the fifth voltage line VL5).

Figure 8:
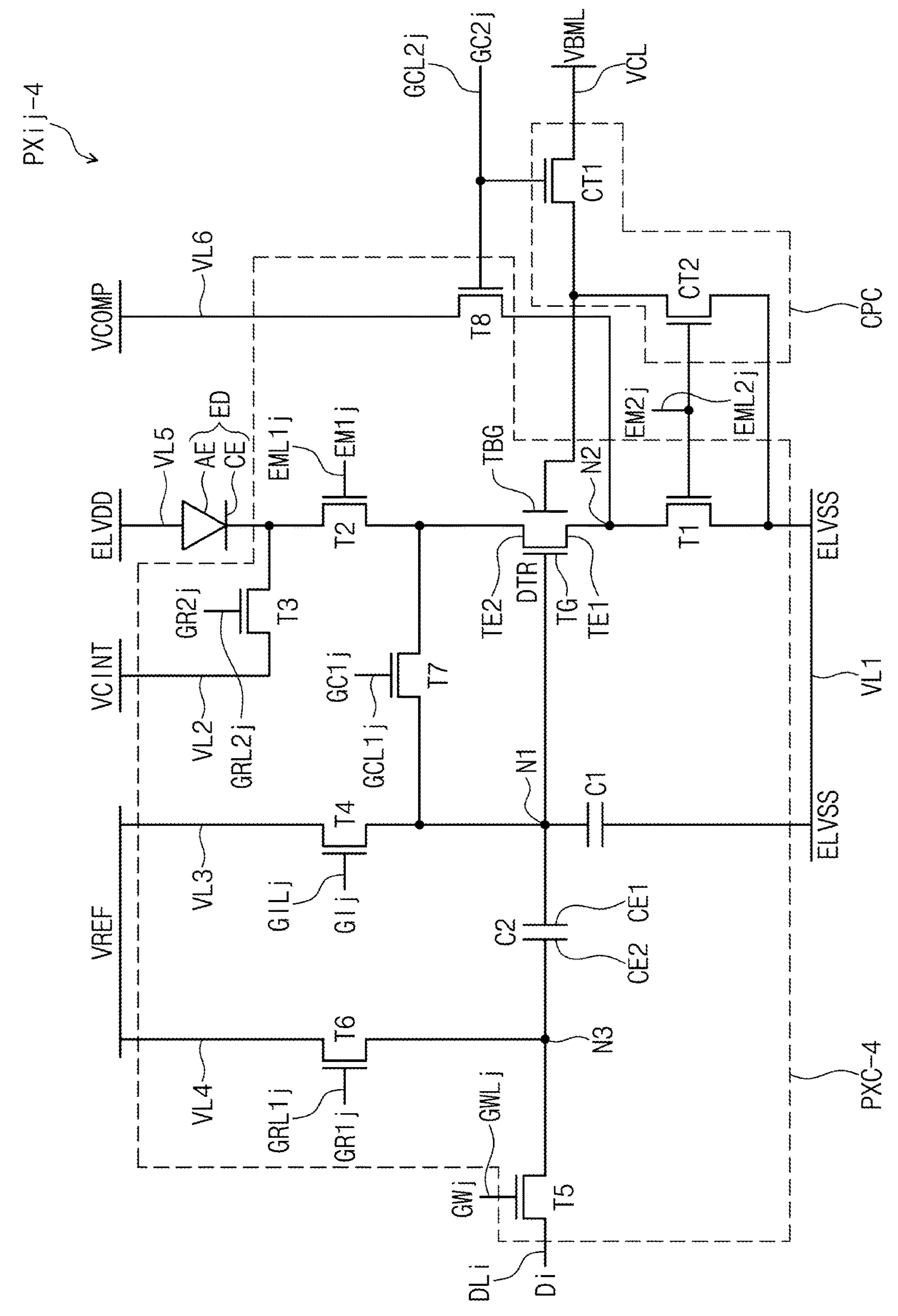
FIG. 8 is an equivalent circuit diagram of a pixel according to an embodiment of the inventive concept.

FIG. 8 is an equivalent circuit diagram of a pixel PXij-4 according to an embodiment of the inventive concept. When a description is given with reference to FIG. 8, portions different from those of FIG. 2 will be described, and the same components are denoted by the same reference numerals, and a description of the same components will not be given.

Referring to FIG. 8, a pixel PXij-4 may include a first circuit PXC-4, a second circuit CPC, and at least one light emitting element ED. The pixel PXij-4 may be connected to a j-th first initialization scan line GILj, a j-th second initialization scan line GRL1j, a j-th third initialization scan line GRL2j, a j-th first compensation scan line GCL1j, a j-th second compensation scan line GCL2j, a j-th write scan line GWLj, a j-th first emission control line EML1j, a j-th second emission control line EML2j, and an i-th data line DLi.

The j-th first initialization scan line GILj may transmit a first initialization scan signal GIj, the j-th second initialization scan line GRL1j may transmit a second initialization scan signal GR1j, and the j-th third initialization scan line GRL2j may transmit a third initialization scan signal GR2j. The second initialization scan signal GR1j and the third initialization scan signal GR2j may have the same waveforms, but are not particularly limited thereto, and may have different waveforms.

The j-th first compensation scan line GCL1j may transmit a first compensation scan signal GC1j, and the j-th second compensation scan line GCL2j may transmit a second compensation scan signal GC2j. The first compensation scan signal GC1j and the second compensation scan signal GC2j may have the same waveforms, but are not particularly limited thereto, and may have different waveforms.

The j-th first emission control line EML1j may transmit a first emission control signal EM1j, and the j-th second emission control line EML2j may transmit a second emission control signal EM2j. The first emission control signal EM1j and the second emission control signal EM2j may have the same waveforms, but are not particularly limited thereto, and may have different waveforms.

The j-th write scan line GWLj may transmit a write scan signal GWj, and the i-th data line DLi may transmit a data signal Di. The data signal Di may have a voltage level corresponding to a gradation value of an image data signal DATA outputted from a driving controller 100.

Figure 9:
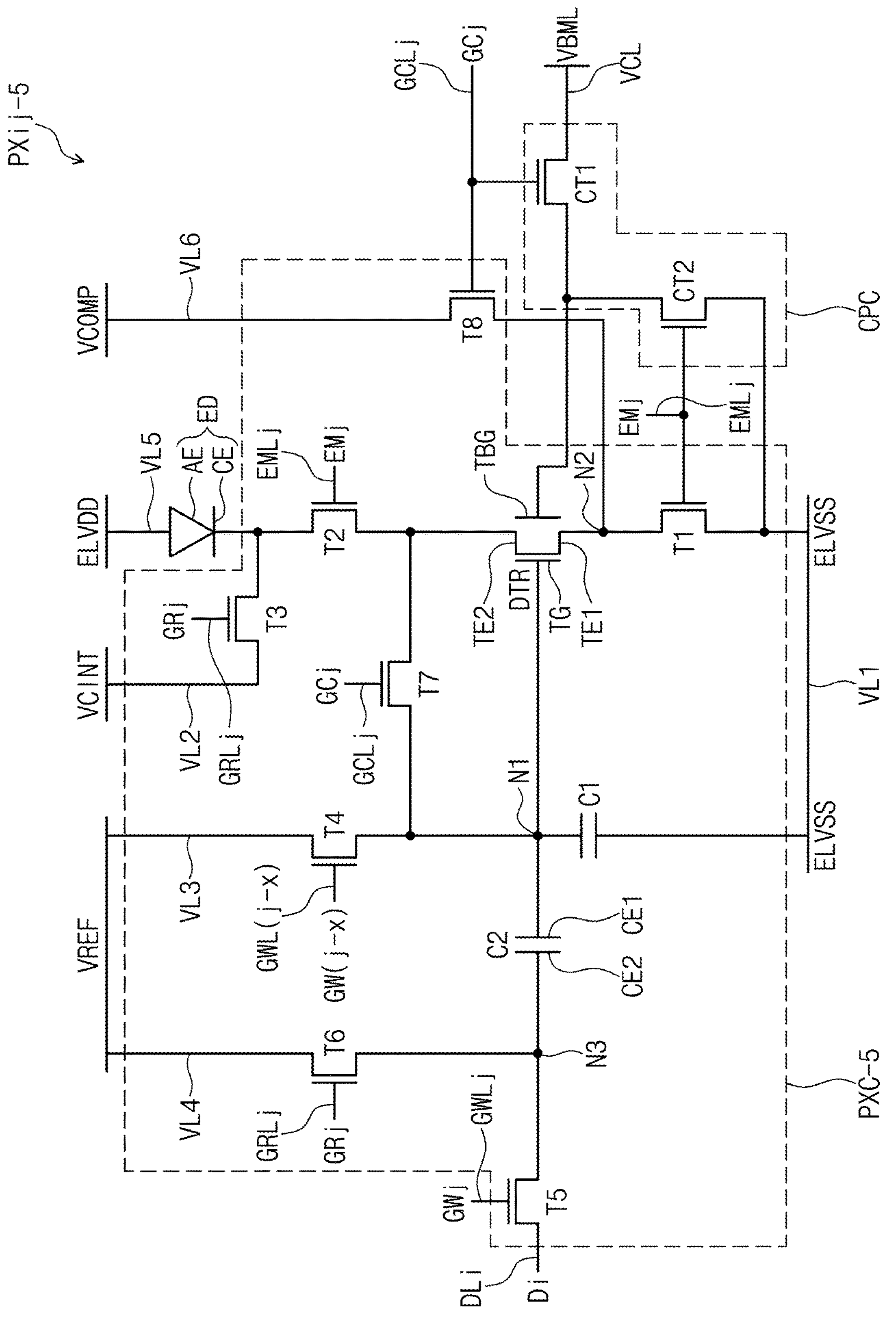
FIG. 9 is an equivalent circuit diagram of a pixel according to an embodiment of the inventive concept.

FIG. 9 is an equivalent circuit diagram of a pixel PXij-5 according to an embodiment of the inventive concept. When a description is given with reference to FIG. 9, portions different from those of FIG. 2 will be described, and the same components are denoted by the same reference numerals, and a description of the same components will not be given.

Referring to FIG. 9, a pixel PXij-5 may include a first circuit PXC-5, a second circuit CPC, and at least one light emitting element ED. The pixel PXij-5 may be connected to a j-th first initialization scan line GWL(j−x), a j-th second initialization scan line GRLj, a j-th compensation scan line GCLj, a j-th write scan line GWLj, a j-th emission control line EMLj, and an i-th data line DLi.

The j-th first initialization scan line GWL(j−x) may correspond to a write scan line of another row, for example, a (j−x)-th write scan line GWL(j−x). Here, x may be a positive integer or a negative integer. According to the embodiment illustrated in FIG. 9, the write scan line GWL (j−x) of the other row and a write scan signal GW(j−x) provided thereto may be used as the first initialization scan line and a first initialization scan signal thereof, respectively.

Figure 10:
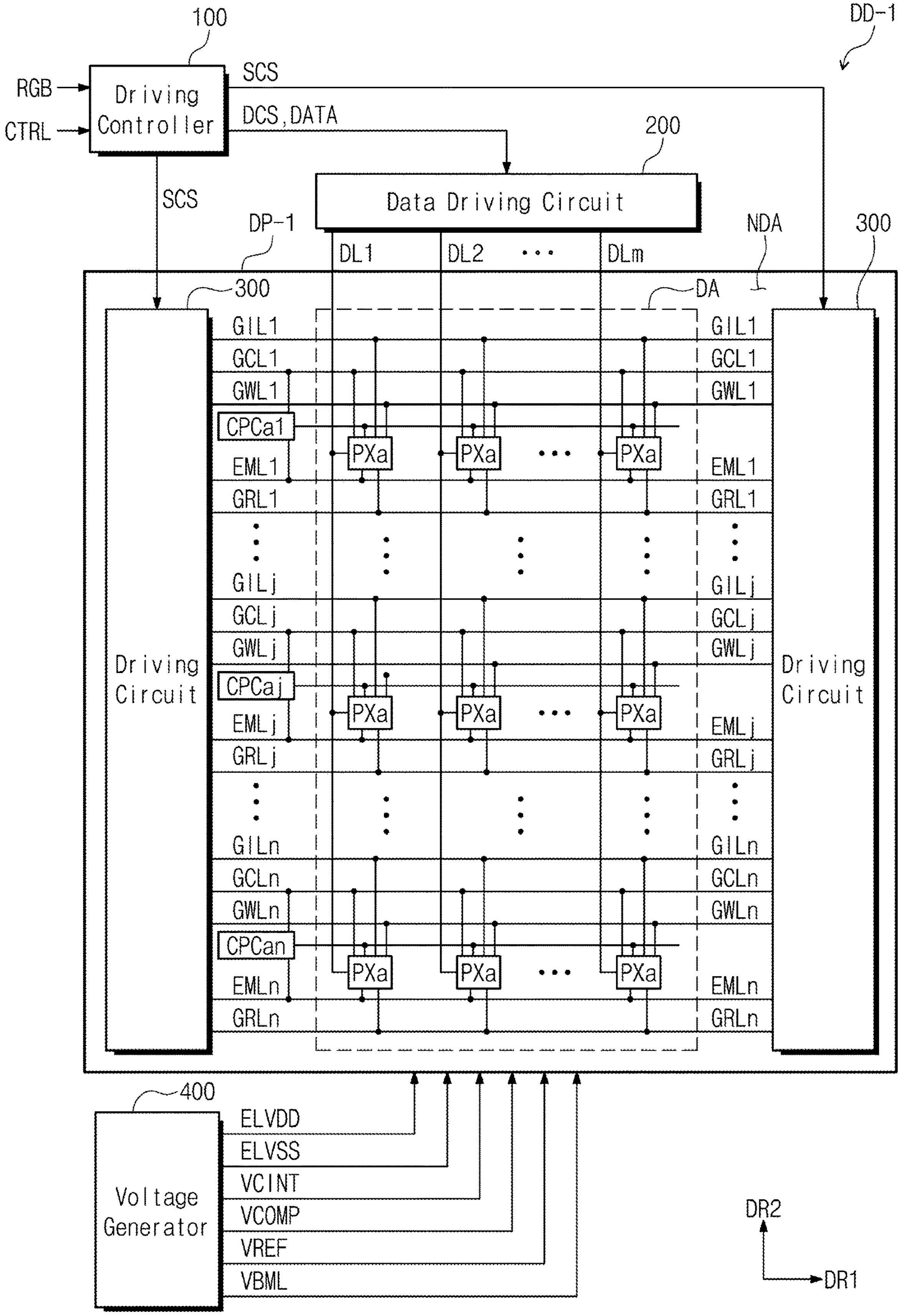
FIG. 10 is a block diagram of a display device according to an embodiment of the inventive concept.
Figure 11:
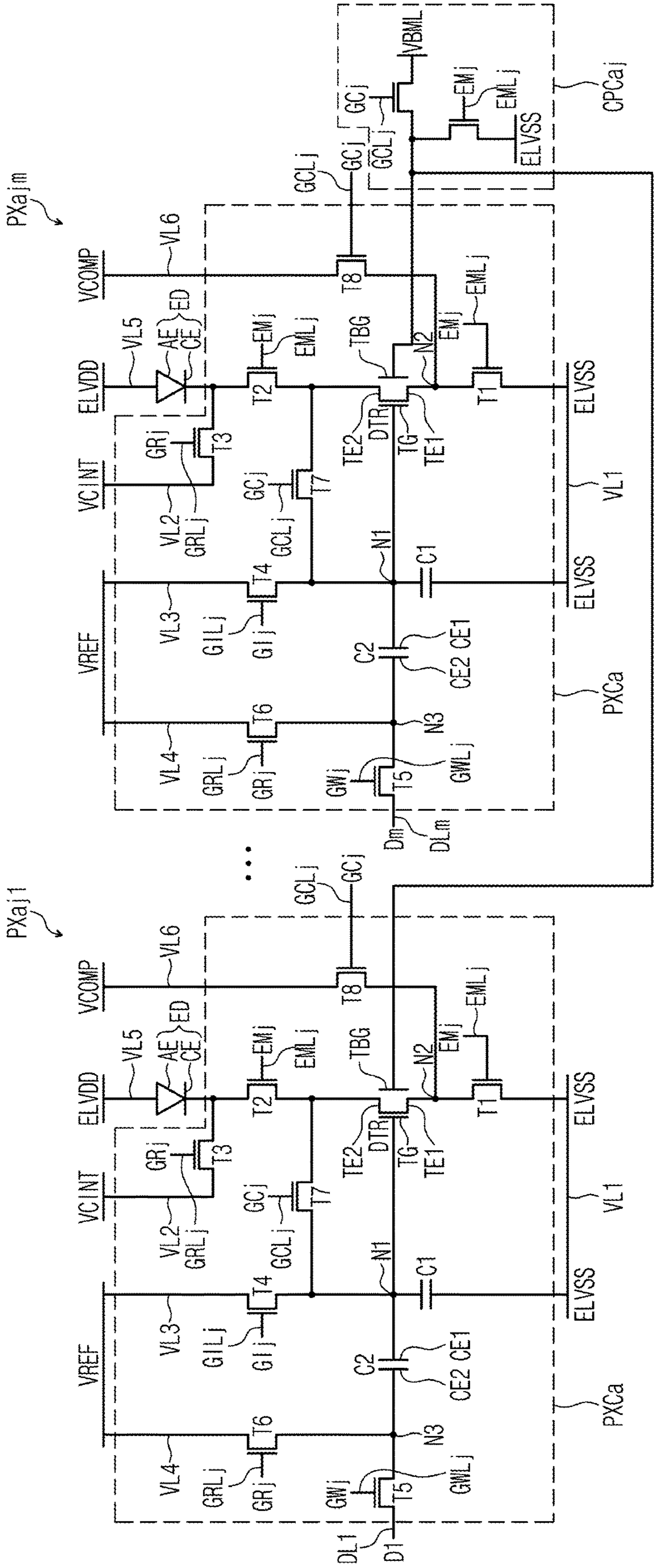
FIG. 11 is an equivalent circuit diagram of a row of pixels and a second circuit according to an embodiment of the inventive concept.

FIG. 10 is a block diagram of a display device DD-1 according to an embodiment of the inventive concept. FIG. 11 is an equivalent circuit diagram of a row of pixels PXaj1 to PXajm and a second circuit CPCaj according to an embodiment of the inventive concept. When descriptions are given with reference to FIGS. 10 and 11, portions different from those of FIGS. 1 and 2 will be described, and the same components are denoted by the same reference numerals, and a description of the same components will not be given.

Referring to FIGS. 10 and 11, a display device DD-1 may include a display panel DP-1, a driving controller 100, a panel driver, and second circuits CPCa1 to CPCan. As an example of an embodiment of the inventive concept, the panel driver may include a data driving circuit 200 (or a data driver 200), driving circuits 300, and a voltage generator 400. The display panel DP-1 may include a display area DA and a non-display area NDA. The display panel DP-1 may include a plurality of pixels PXa disposed in the display area DA.

Each of the plurality of pixels PXa according to an embodiment of the inventive concept may include a light emitting element ED and a first circuit PXCa for controlling light emission of the light emitting element ED.

The light emitting element ED may be provided in plurality. For example, the number of the light emitting elements ED provided may be m×n. The first circuit PXCa may be provided in plurality. For example, the number of the first circuits PXCa provided may be m×n. The plurality of first circuits PXCa may be electrically connected, in one-to-one correspondence, to the plurality of light emitting elements ED, respectively.

Each of the second circuits CPCa1 to CPCan may be electrically connected to first circuits PXCa arranged in one row among the plurality of first circuits PXCa. Pixels PXaj1 to PXajm arranged in a j-th row are illustrated as an example in FIG. 11. A first pixel PXaj1 among the pixels PXaj1 to PXajm arranged in the j-th row may be connected to a first data line DL1 to receive a data signal D1, and an m-th pixel PXajm among the pixels PXaj1 to PXajm arranged in the j-th row may be connected to an m-th data line DLm to receive a data signal Dm. The m number of pixels PXaj1 to PXajm arranged in one row may be electrically connected to one second circuit CPCaj. Accordingly, the number of the first circuits PXCa included in the display panel DP-1 may be greater than the number of the second circuits CPCa1 to CPCan included therein.

Although, in an embodiment of the inventive concept, the plurality of first circuits PXCa may be disposed in the display area DA, and the second circuits CPCa1 to CPCan may be disposed in the non-display area NDA, an embodiment of the inventive concept is not particularly limited thereto. For example, the second circuits CPCa1 to CPCan may be disposed in the display area DA, or alternatively, a portion of each of the second circuits CPCa1 to CPCan may be disposed in the display area DA, and another portion of each of the second circuits CPCa1 to CPCan may be disposed in the non-display area NDA. Alternatively, some of the second circuits CPCa1 to CPCan may be disposed in the display area DA, and the others of the second circuits CPCa1 to CPCan may be disposed in the non-display area NDA.

In an embodiment of the inventive concept, some of first to eighth pixel transistors T1, T2, T3, T4, T5, T6, T7, and T8 included in each of the plurality of first circuits PXCa may be disposed in the non-display area NDA. In addition, at least one pixel transistor disposed in the non-display area NDA among the first to eighth pixel transistors T1 to T8 may be connected in common to the plurality of pixels PXa. For example, at least one pixel transistor may be connected in common to pixels PXa arranged in the same row, e.g., the pixels PXaj1 to PXajm arranged in the j-th row.

In the embodiments illustrated in FIGS. 10 and 11, the first circuit PXCa may be referred to as a pixel circuit PXCa. Because each of the second circuits CPCa1 to CPCan is connected to the plurality of first circuits PXCa, the second circuits CPCa1 to CPCan may be referred to as common circuits CPCa1 to CPCan.

Although, in FIGS. 10 and 11, one second circuit is illustrated as an example to be connected to a row of pixels PXa, an embodiment of the inventive concept is not particularly limited thereto. For example, a second circuit connected to some of a row of pixels PXa and another second circuit connected to the rest of the row of pixels PXa may be provided.

As described above, the driving transistor may be an N-type thin film transistor, and the cathode of the light emitting element may be connected to the drain of the driving transistor. In this case, even when the light emitting element deteriorates, the voltage of the terminal of the source of the driving transistor may not shift. That is, even when the usage time of the display panel increases, the variation in the amount of the current flowing through the driving transistor is reduced, so that an afterimage defect (or a long-term afterimage defect) of the display panel may be reduced, and the lifespan of the display panel may be improved.

In addition, the threshold voltage of the driving transistor may be compensated for by the second circuit. The reverse bias voltage between the back gate electrode and the terminal of the source of the driving transistor may be kept constant as a difference between the first compensation voltage and the second compensation voltage. By adjusting the voltage level of the first compensation voltage, the threshold voltage of the driving transistor may be shifted in a positive direction. In this case, the threshold voltage of the driving transistor, which is the N-type thin film transistor, may be compensated for in a diode connection method. In this case, compensation stability may be improved because a value reflecting the threshold voltage of the driving transistor is directly applied to the gate electrode of the driving transistor.

Although embodiments of the present inventive concepts have been described, various modifications and similar arrangements of such embodiments will be apparent to a person of ordinary skill in the art. Accordingly, the inventive concepts are not limited to such embodiments, but rather to the scope and spirit of the appended claims.

What is claimed is:

1. A display device comprising:

a first circuit which is electrically connected to a data line, a plurality of scan lines, and a plurality of voltage lines, and includes a driving transistor including a first electrode, a second electrode, a gate electrode, and a back gate electrode;

a light emitting element including an anode, and a cathode connected to the first circuit; and a second circuit including a first transistor connected between the back gate electrode of the driving transistor and a compensation voltage line, and a second transistor connected between the back gate electrode of the driving transistor and a first voltage line among the plurality of voltage lines.

2. The display device of claim 1, wherein the first circuit is provided in plurality, the light emitting element is provided in plurality, the plurality of first circuits are electrically connected, in one-to-one correspondence, to the plurality of light emitting elements, respectively, and the second circuit is electrically connected to first circuits arranged in one row among the plurality of first circuits.

3. The display device of claim 1, wherein the first circuit is provided in plurality, the light emitting element is provided in plurality, the second circuit is provided in plurality, the plurality of first circuits are electrically connected, in one-to-one correspondence, to the plurality of light emitting elements, respectively, and the plurality of second circuits are electrically connected, in one-to-one correspondence, to the plurality of first circuits, respectively.

4. The display device of claim 1, wherein the first circuit comprises:

a first pixel transistor connected between the first electrode of the driving transistor and the first voltage line;

a second pixel transistor connected between the second electrode of the driving transistor and the cathode of the light emitting element;

a third pixel transistor connected between the cathode of the light emitting element and a second voltage line among the plurality of voltage lines;

a fourth pixel transistor connected between the gate electrode of the driving transistor and a third voltage line among the plurality of voltage lines;

a first capacitor connected between the gate electrode of the driving transistor and the first voltage line;

a second capacitor including a first electrode connected to the gate electrode of the driving transistor and a second electrode;

a fifth pixel transistor connected between the second electrode of the second capacitor and the data line; and a sixth pixel transistor connected between the second electrode of the second capacitor and a fourth voltage line among the plurality of voltage lines, wherein the anode of the light emitting element is connected to a fifth voltage line among the plurality of voltage lines.

5. The display device of claim 4, wherein the first circuit further comprises:

a seventh pixel transistor connected between the gate electrode of the driving transistor and any one of the first electrode and the second electrode of the driving transistor; and an eighth pixel transistor connected between the other of the first electrode and the second electrode of the driving transistor and a sixth voltage line among the plurality of voltage lines.

6. The display device of claim 5, wherein a gate electrode of the eighth pixel transistor and a gate electrode of the first transistor are connected to the same scan line among the plurality of scan lines, and operations of the eighth pixel transistor and the first transistor are controlled by the same scan signal.

7. The display device of claim 5, wherein operations of the first pixel transistor and the second transistor are controlled by a same signal.

8. The display device of claim 5, wherein, in an initialization period in which the third pixel transistor, the fourth pixel transistor, and the sixth pixel transistor are turned on, the first electrode of the second capacitor, the second electrode of the second capacitor, and the cathode of the light emitting element are initialized.

9. The display device of claim 5, wherein, in a compensation period in which the first transistor, the seventh pixel transistor, and the eighth pixel transistor are turned on, a voltage obtained by adding a threshold voltage of the driving transistor to a voltage provided through the sixth voltage line is applied to the gate electrode of the driving transistor.

10. The display device of claim 9, wherein, in a data write period in which the fifth pixel transistor is turned on, a data voltage provided through the data line is applied to the second electrode of the second capacitor, and in an emission period in which the first pixel transistor and the second pixel transistor are turned on, a current path is established between the first voltage line and the light emitting element, and a current, from which an influence of the threshold voltage of the driving transistor is removed, flows through the current path.

11. The display device of claim 5, wherein the third voltage line is the fourth voltage line.

12. The display device of claim 5, wherein the second voltage line is the fifth voltage line.

13. The display device of claim 1, wherein the driving transistor is an N-type thin film transistor.

14. A display device comprising:

a first circuit including a driving transistor including a first electrode, a second electrode, a gate electrode, and a back gate electrode; and a light emitting element including an anode, and a cathode connected to the first circuit, wherein the first circuit is configured so that, in a compensation period, a first compensation voltage is applied to the back gate electrode of the driving transistor, a second compensation voltage is applied to the first electrode of the driving transistor, and a voltage obtained by adding a threshold voltage of the driving transistor to the second compensation voltage is applied to the gate electrode of the driving transistor.

15. The display device of claim 14, wherein the first circuit is configured so that a current path is established between a driving voltage line and the light emitting element in an emission period, and a current, from which an influence of the threshold voltage of the driving transistor is removed, flows through the current path in the emission period.

16. The display device of claim 14, further comprising:

a first transistor connected between the back gate electrode of the driving transistor and a compensation voltage line to which the first compensation voltage is applied; and a second transistor connected between the back gate electrode of the driving transistor and a driving voltage line.

17. The display device of claim 16, wherein the first circuit is provided in plurality, the light emitting element is provided in plurality, the plurality of first circuits are electrically connected, in one-to-one correspondence, to the plurality of light emitting elements, respectively, and each of the first transistor and the second transistor is electrically connected to first circuits arranged in one row among the plurality of first circuits.

18. The display device of claim 16, wherein the first circuit is provided in plurality, the light emitting element is provided in plurality, the first transistor is provided in plurality, the second transistor is provided in plurality, the plurality of first circuits are electrically connected, in one-to-one correspondence, to the plurality of light emitting elements, respectively, the plurality of first transistors are electrically connected, in one-to-one correspondence, to the plurality of first circuits, respectively, and the plurality of second transistors are electrically connected, in one-to-one correspondence, to the plurality of first circuits, respectively.

19. The display device of claim 14, wherein the driving transistor is an N-type thin film transistor.

20. A method of driving a display device comprising a pixel including a first circuit including a driving transistor including a first electrode, a second electrode, a gate electrode, and a back gate electrode, and a light emitting element including an anode, and a cathode connected to the first circuit, the method comprising:

initializing the cathode of the light emitting element;

compensating by applying a voltage obtained by adding a threshold voltage of the driving transistor to a second compensation voltage to the gate electrode of the driving transistor by applying a first compensation voltage to the back gate electrode of the driving transistor and applying the second compensation voltage to the first electrode of the driving transistor; and allowing the light emitting element to emit light by allowing a current, from which an influence of the threshold voltage of the driving transistor is removed, to flow from the first electrode of the driving transistor to the second electrode thereof.

21. An electronic device, comprising:

a first circuit which is electrically connected to a data line, a plurality of scan lines, and a plurality of voltage lines, and includes a driving transistor including a first electrode, a second electrode, a gate electrode, and a back gate electrode;

a light emitting element including an anode, and a cathode connected to the first circuit; and a second circuit including a first transistor connected between the back gate electrode of the driving transistor and a compensation voltage line, and a second transistor connected between the back gate electrode of the driving transistor and a first voltage line among the plurality of voltage lines.

* * * * *